UNITED STATES PATENT OFFICE.

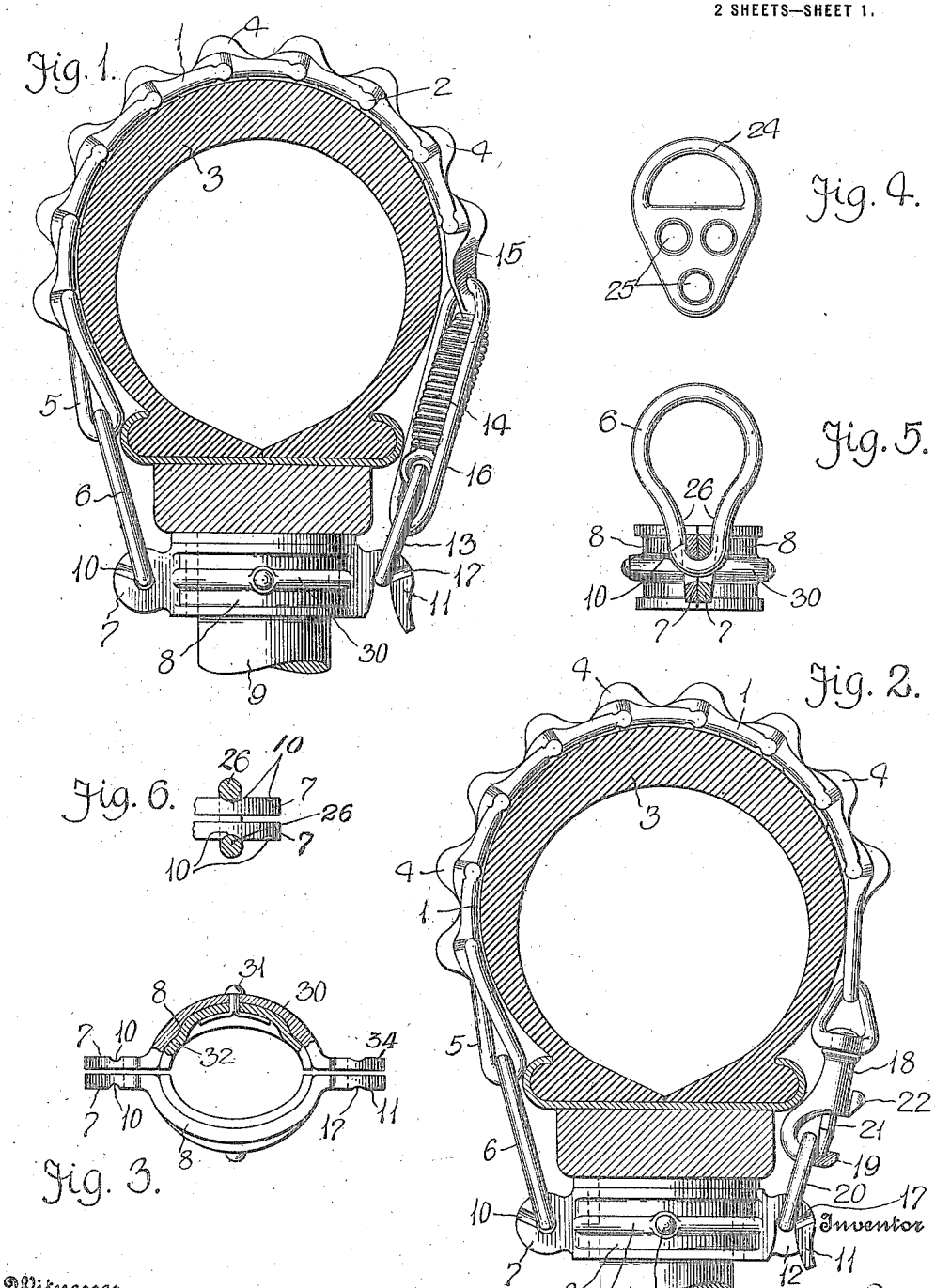

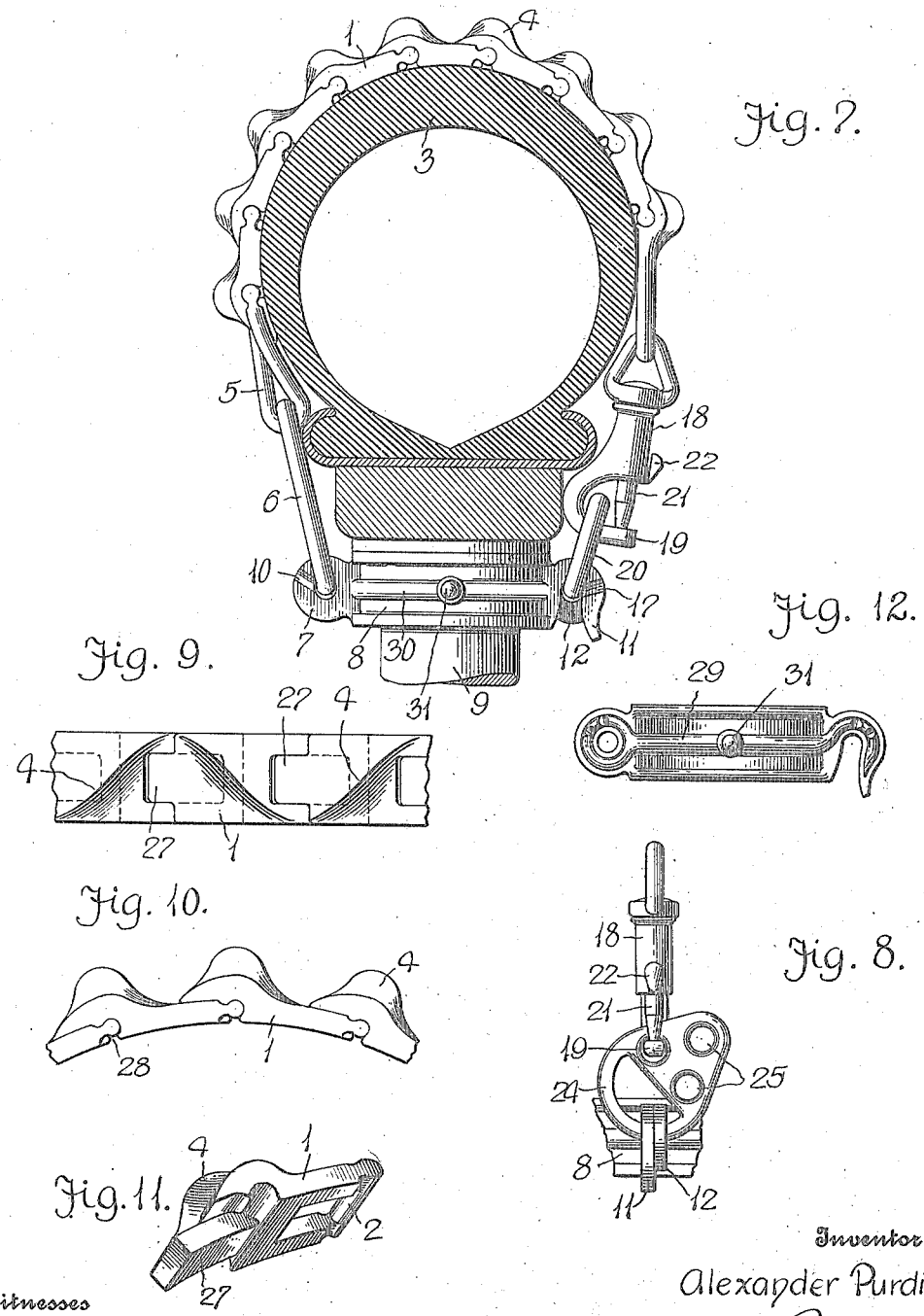

ALEXANDER PURDIE, OF WYANDOTTE, MICHIGAN.

SNAP CONNECTION FOR TIRE-CHAINS.

1,273,271.　　　　　　Specification of Letters Patent.　　Patented July 23, 1918.

Application filed May 13, 1915. Serial No. 27,742.

*To all whom it may concern:*

Be it known that I, ALEXANDER PURDIE, a citizen of the United States of America, residing at Wyandotte, in the county of Wayne and State of Michigan, have invented certain new and useful Improvements in Snap Connections for Tire-Chains, of which the following is a specification, reference being had therein to the accompanying drawings.

This invention relates to tire chains or mud chains for tires for the traction bearing wheels of vehicles and to an arrangement thereof whereby the chains are readily secured in position, the connecting portions accommodating themselves to wheels of different dimensions and automatically adjusting themselves without the necessity of the use of hand tools in applying or releasing them.

The invention consists in the matters hereinafter set forth and more particularly pointed out in the appended claims.

In the drawings, Figure 1 is a view in section of a tire and rim equipped with a mud chain that embodies features of the invention;

Fig. 2 is a similar view showing a slight modification in the holding means;
Fig. 3 is a view in detail of a spoke clamp;

Fig. 4 is a view in detail of a link plate;

Fig. 5 is a view in detail of a spoke clamp and link;

Fig. 6 is a view in detail showing the application of the clamp link;

Fig. 7 is a view in detail showing a modification of the chain;

Fig. 8 is a view in detail showing the application of the link and snap hook to a spoke clamp;

Figs. 9, 10 and 11 are views in detail of the chain shown in Fig. 7, and

Fig. 12, is a view showing a modification of the clamp.
Referring to the drawings, a series of sections 1 each in the form of a rectangular link having a hooked tongue at one end adapted to engage over the corresponding side 2 of the adjacent link are connected to form a chain of sufficient length to extend across the face of a tire 3 as indicated. Each link has a diagonally arranged, sinuous projection 4 with concave faces blending smoothly into the body of the link. The links are made right and left handed to reverse the direction of these projections and are arranged to detachably hook together in the manner of a sprocket chain.

A suitable link 5 couples one end of the sections with a clamp link 6. The latter passes through an opening in the lugs 7 of a pair of oppositely disposed spoke clamp sections 8 that are curved to conform and grip closely about a spoke 9. Preferably the lugs have grooves 10 into which the slightly divergent arms 26 (Fig. 5) of the link 6 are crowded, the upper edges of the lugs being wider than the lower margins so that the lugs are vertically wedge shaped, there being two or more sets of grooves 10, so that the member 6 may be more or less inclined to accommodate itself to different widths of fellies or tires. As herein indicated, it is snapped or crowded into the inner set of grooves while the other set is shown unoccupied. A hook 11 on one of the clamp sections 8 and a corresponding hook on the other section, both diametrically opposite the lugs 7 are arranged to receive a link 13 that is connected by a spring 14 and spudded link 15 with the other end of the tread section. A guard link 16 prevents undue distention of the spring. The hook 11 and companion lug 34 are provided with sets of divergent grooves 17 so that the ring 13 may be crowded into any one pair of grooves and thereby yieldingly lock in the oblique position assumed, dependent upon the width of the tire, the link of course crowding the hooks together in a similar manner to the link 6.

In Figs. 2, 7 and 8 a slight modification is shown in the fastening means by the introduction of a swiveled snap hook 18 having a straight finger 19 so that the member 20 into which it is inserted is under the same tension at the point of entrance of the finger as it is when the finger is pushed through far enough to allow a tapered spring plunger or latch 21 with finger pull 22 to crowd past it. In this instance also one of the otherwise similar hooks 11 may be replaced by a lug 12 with opening therethrough. The member 20 may take the form shown in Figs. 4 and 8 with a semi-circular loop 24 and a plurality of hook openings 25, the conformation of the loop 24 permitting the inserted hook to always exert a straight pull as indicated in Fig. 8.

In Figs. 7, 9, 10 and 11, a slight modification of the chain links is shown. In this instance each link has an extension 27 on its tongue that extends well into the opening of the companion link engaged by the tongue so that the open spaces or notches between the links are minimized. At the same time the body of the link is extended to form a rule joint that maintains a flush surface on the inner side of the tread section for preventing the links being bent inwardly. This effectively avoids indenting of the surface of the tire.

In Fig. 12 there is shown a clamp having a central bead 29 that stiffens both the body of the clamp and the lugs and hooks. It like the corresponding rib 30, of the other form, is hollow to admit the clenching of a rivet 31 to hold a lining 32 of soft fabric, leather or the like, without projecting sufficiently to mar an inclosed spoke.

As a result of this construction an anti-skidding device is obtained that may be quickly adjusted to any size tire and any form of rim or spoke without special tools, as the clamp maintains its position when under strain because of the wedging of the clamp locks into the holding links of the chain.

Obviously, changes in the details of construction may be made without departing from the spirit of my invention and I do not care to limit myself to any particular form or arrangement of parts.

What I claim is:—

1. An anti-skidding device for tires comprising a chain tread section adapted to embrace and conform to a tire tread, a pair of clamp sections adapted to grip the spokes between them and provided with oppositely disposed lugs, links engaging each pair of lugs and adapted to draw the clamp sections together when under strain, and means for detachably connecting one of the links with the adjacent end of the sections.

2. An anti-skidding device for tires comprising a chain tread section adapted to conform to a tire tread when disposed transversely thereon, a fixed link attached to one end portion, a pair of clamp sections adapted to grip a spoke between them and provided with oppositely disposed pairs of lugs, one pair of which is engaged by the fixed link, a link adapted to hook over the opposite pair of lugs and to force them and the clamp sections toward each other when under strain, and means detachably connecting the link with the other end of the tread section.

In testimony whereof I affix my signature in presence of two witnesses.

ALEXANDER PURDIE.

Witnesses:
C. R. STICKNEY,
ANNA M. DORR.